Patented July 31, 1951

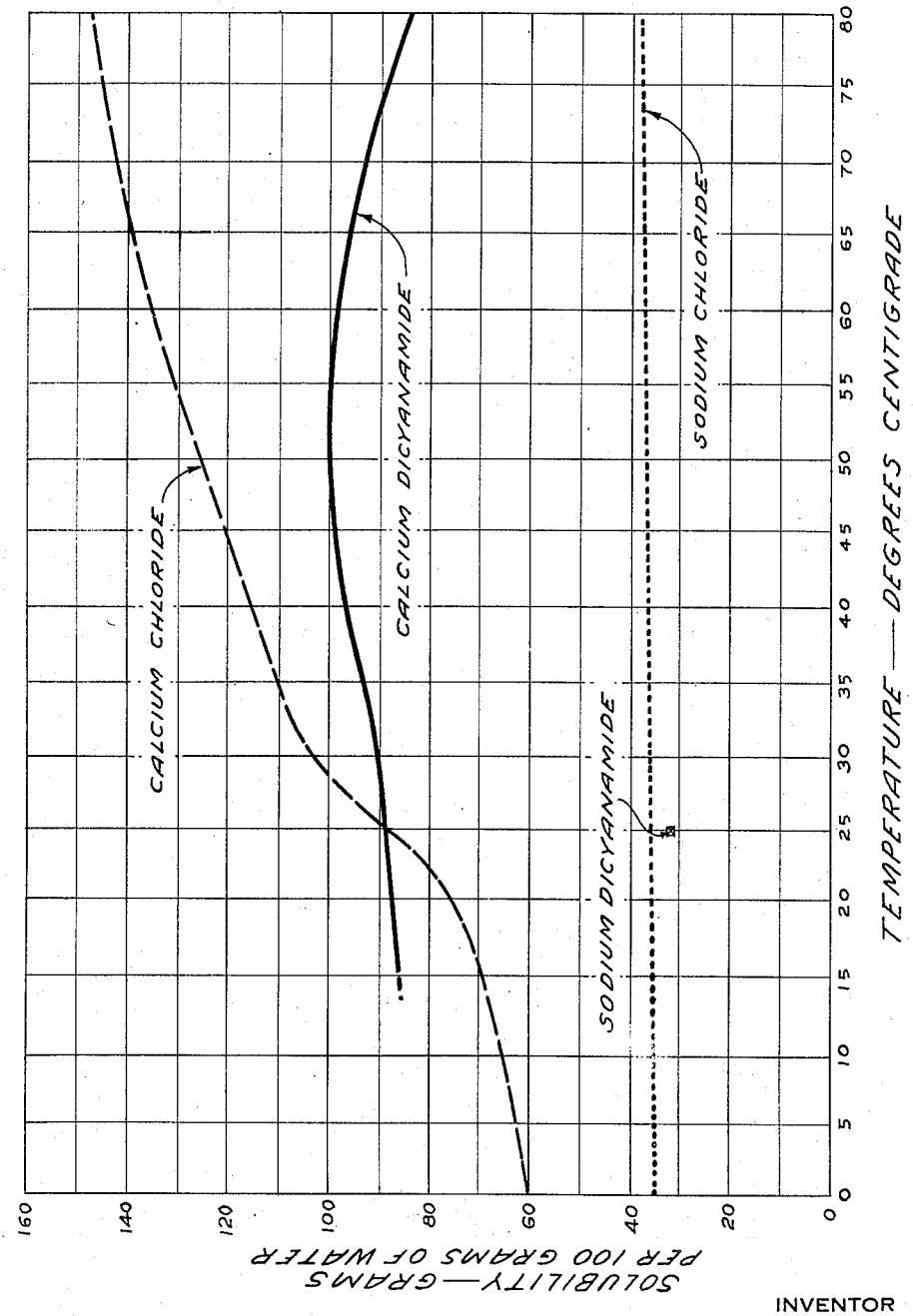

2,562,869

UNITED STATES PATENT OFFICE 2,562,869

CALCIUM DICYANAMIDE AND PROCESS FOR THE PREPARATION THEREOF

Daniel E. Nagy, Stamford, Conn., assignor to American Cyanamid Company, New York, N. Y., a corporation of Maine Application May 13, 1950, Serial No. 161,860

7 Claims. (Cl. 23—78)

This invention relates to calcium dicyanamide and its dihydrate, and to a method for the preparation of these materials.

In the past it has been proposed to prepare sodium dicyanamide by reaction of disodium cyanamide with cyanogen bromide. This reaction was disadvantageous for a number of reasons.

In the first place, disodium cyanamide is not an article of commerce and is prepared from calcium cyanamide by a series of delicate and inefficient reactions. Secondly, yields of sodium dicyanamide were found to be poor. Thirdly, it was found that during the main reaction leading to the formation of sodium dicyanamide a large proportion of sodium hydroxide is formed by the side reaction (1) 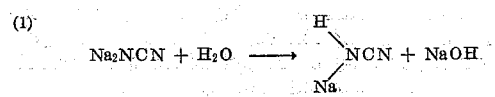

and that this sodium hydroxide reacts readily with the cyanogen bromide to form a large proportion of sodium cyanate. Aside from the question of waste of materials, the sodium cyanate thus formed, like sodium dicyanamide, is quite soluble, and therefore the presence of the large amount of soluble sodium cyanate in the final crude solution of sodium dicyanamide presented a serious purification problem. Finally, sodium dicyanamide, as such, was found to be insufficiently useful, in that it was not a suitable raw material for the direct preparation of the numerous other soluble salts of dicyanamide. The direct preparation of these soluble salts involves a double decomposition reaction, and no industrially practical way of precipitating sodium is known.

The surprising discoveries have now been made that calcium dicyanamide may be prepared directly from calcium cyanamide and cyanogen chloride or bromide in one simple step, and that even the crude fertilizer grade of calcium cyanamide gives yields of the desired product in this reaction which are substantially the same as when the pure equivalent of crude calcium cyanamide is employed. It has further been found that calcium dicyanamide is a compound of amazingly high solubility, and that it is about three times as soluble as sodium dicyanamide. As is shown in the drawing, this solubility is about 88% at room temperature, and surprisingly does not change significantly over the range 20° C.–75° C. This flat solubility curve permits the efficient separation of calcium dicyanamide from a wide variety of soluble salts having sharply inclined solubility curves by selecting temperature ranges and concentrations appropriate for this purpose.

When calcium cyanamide is slurried in water, calcium hydroxide is formed as the result of a reaction which parallels Equation 1 above. The surprising discovery has been made, however, that the calcium hydroxide thus formed in the presence of calcium acid cyanamide, unlike the sodium hydroxide formed in Equation 1, is virtually inert to cyanogen chloride under the conditions which are optimum for the formation of calcium dicyanamide, that only a negligible proportion of calcium cyanate forms, and that therefore the purification problem noted above in the case of the sodium reaction is virtually non-existent when calcium cyanamide is employed as the raw material. As a result, nearly theoretically high yields of the desired product are achieved. Finally, it has been found that calcium dicyanamide is an ideal material for the direct preparation of the sodium and other soluble salts of dicyanamide, in that addition of the sulfate or carbonate of the metal which it is desired to introduce causes immediate and complete precipitation of all the calcium which was present as calcium dicyanamide. For example, addition of ammonium sulfate to calcium dicyanamide solution causes precipitation of the calcium as calcium sulfate, and a solution of pure ammonium dicyanamide results. This result is impossible when sodium dicyanamide is employed as the starting material.

Calcium dicyanamide has distinctive properties as compared with those possessed by the salts of dicyanamide with monovalent metals such as sodium. For example, the monovalent salts polymerize readily when strongly heated and form the soluble tri-metallic derivatives of tricyanomelamine. Calcium dicyanamide, however, when heated under the same conditions also polymerizes, but the material thus obtained is amorphous and insoluble.

A further difference between the two is that calcium dicyanamide forms a stable hydrate, whereas the sodium and potassium dicyanamides form no hydrates whatever.

According to the present invention, calcium cyanamide is first slurried in water. This leads to the formation of calcium acid cyanamide:

(2) 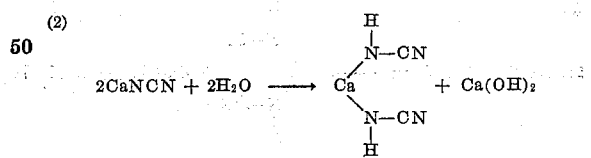

Cyanogen chloride is then added to this slurry, whereupon calcium dicyanamide and hydrochloric acid are produced:

(3) 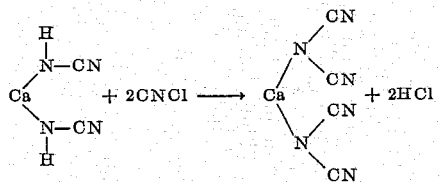

During this main reaction the side reaction noted above takes place leading to the formation of a small proportion of calcium cyanate:

(4) $Ca(OH)_2 + 2CNCl \rightarrow Ca(CNO)_2 + 2HCl$

The hydrochloric acid formed during reactions (3) and (4) reacts with the calcium hydroxide formed in the course of reaction (2).

When cyanogen chloride is employed as shown above, reaction (4) proceeds only to a negligible extent (3%–5%), and therefore upon completion of reaction (3) a crude solution is obtained containing principally calcium dicyanamide and calcium chloride in approximately equimolecular proportions.

In performing reaction (2) it is not necessary to use pure calcium cyanamide or pure calcium acid cyanamide. Instead, ordinary crude fertilizer grade calcium cyanamide may be employed and with this material without any previous purification, yields of more than 90% have been obtained.

It is surprising that crude calcium cyanamide may be employed so successfully in the reaction. Crude calcium cyanamide contains only about 60% calcium cyanamide. The balance is a complex mixture of organic and inorganic compounds and carbon. It could not be predicted that merely contacting a slurry of such a grossly impure composition with cyanogen chloride, acidifying, and concentrating the resulting solution would give a precipitate of calcium dicyanamide of over 90% purity in yields of about 90%. It could not be predicted that the calcium dicyanamide and the calcium chloride present in the crude solution would almost completely salt out or suppress the solubilization of the large number of impurities present in a crude calcium cyanamide slurry.

It is a surprising and advantageous feature of the instant invention that the impurities present in crude calcium cyanamide do not appear to react during the instant process and that they are substantially insoluble in the final reaction solution. As a result, they may be readily separated by filtration or decantation, leaving a solution containing only calcium dicyanamide, calcium chloride, and calcium cyanate as significant constituents.

It is not necessary to use a preformed calcium cyanamide, although this is the preferred material from the point of view of cheapness. It is possible to produce the equivalent of this material by reacting an aqueous solution of free cyanamide with aqueous calcium hydroxide according to the equation (5) 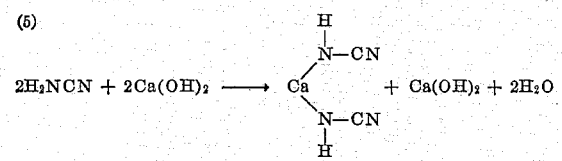

The solution thus obtained contains calcium acid cyanamide and corresponds to the solution formed in reaction (2), and may be employed in the reactions outlined above as an equivalent thereof. Use of free cyanamide is ordinarily not advantageous, however, one reason being that in its anhydrous form it must be kept under refrigeration, and in aqueous solution this material is unstable and tends to polymerize when present in a concentration greater than about 20%. As a result, with this material it is necessary to handle and process an undesirably large proportion of water.

In performing reaction (2), the time of slurrying may be very brief or even may be omitted entirely. Yields of well over 80% are obtained after only a few minutes of stirring, and the improvement continues gradually as stirring is continued over a period of about an hour. This high initial reactivity towards cyanogen chloride is very surprising, as crude calcium cyanamide is an insoluble material which is ordinarily coated with a water-repellant material.

The reaction may be run at any moderate temperature but at temperatures above 50° C. disadvantageous yields are obtained due, in part, to undesirable side reactions involving the cyanogen chloride. The reaction may be conducted below 0° C., but in that range the speed of the reaction becomes undesirably slow. I prefer to operate in the range of 20°–30° C. which makes it possible to conduct this reaction with high yields in ordinary equipment without any need for heating or for appreciable cooling of the reagents. The cyanogen chloride is passed into the aqueous medium at a rate sufficiently slow that escape of cyanogen chloride is reduced to a minimum, in accordance with best engineering practice. When a closed reaction vessel is used, cyanogen chloride vapor may be added above the surface and is readily absorbed thereby. In adding the cyanogen chloride in this way, the surface should be stirred. The speed of addition is not critical. The cyanogen chloride is usually added over the period 1.5–3 hours, the slower rate of addition apparently slightly increasing the yield of product.

It is a particular advantage of this invention that ordinary steel equipment may be used, and that no particular design of apparatus is necessary.

When less than one mol of cyanogen chloride is allowed to react with the reaction mixture per mol of calcium cyanamide and/or calcium acid cyanamide present, an incomplete reaction will result from which, however, a yield of calcium dicyanamide can be obtained. It is not advantageous to react more than about one mol of cyanogen chloride per mol of calcium cyanamide and calcium acid cyanamide present because a greater excess does not further the desired reaction.

When crude calcium cyanamide is the raw material, a considerable proportion of insoluble material is present after completion of the reaction. It should be removed by filtration or by decantation.

It is a further particular advantage of the present invention that the above-described crude solution of calcium dicyanamide, after removal of any insolubles, as stated above, and neutralized or made slightly acid, is very stable and can be stored or used without further processing as a valuable industrial raw material. For example, it may be reacted at about atmospheric pressure with hydrogen sulfide forming first cyanothiourea and then dithiobiuret. Calcium dicyanamide dihydrate itself has proved unique as a most effective fluidizing agent for starch adhesives, in some instances being more than twice as effective as sodium dicyanamide for this purpose. A much broader utility is indicated by the fact that the solution readily reacts with amines to form a wide variety of cyanoguanidines and disubstituted biguanides.

Upon completion of reactions of the latter type, frequently compounds of low or moderate solubility are obtained which precipitate or which can be recovered in substantially pure form by concentrating the solution. The thus-prepared compounds of low solubility readily precipitate, leaving the very soluble calcium chloride in the solution.

Calcium dicyanamide dihydrate may be recovered from the above-described crude solutions of calcium dicyanamide in several ways.

One simple means is to concentrate the solution, whereupon calcium dicyanamide dihydrate precipitates in substantially pure form. This precipitation is greatly assisted by the presence of the calcium chloride, which exerts a pronounced salting out effect. By this means, recoveries of about 90% of calcium dicyanamide in solution is effected in a form about 90% pure. The product obtained can be further purified.

The above-noted salting out effect was quite unsuspected, because when a solution containing equimolecular proportions of potassium dicyanamide and potassium chloride, and 10% potassium cyanate was concentrated, the potassium chloride was salted out leaving the cyanate and dicyanamide in solution.

A more costly method is based on the precipitation of a metallic dicyanamide by a double decomposition reaction. According to this procedure, with the crude filtered solution neutral or slightly on the acid side to prevent precipitation of zinc hydroxide, one equivalent of a strong solution of a soluble zinc or copper salt is added such as a 30% $ZnCl_2$ solution. Zinc dicyanamide forms and precipitates at once with only slight co-precipitation of impurities; its solubility is less than 4 g. per liter. A solution of calcium dicyanamide more than 90% pure is obtained by reacting an aqueous slurry of the thus-precipitated zinc dicyanamide salt with calcium hydroxide. This results in the formation of insoluble zinc hydroxide which may be removed from the aqueous calcium dicyanamide solution. Pure calcium dicyanamide dihydrate may then be recovered by evaporation of the resulting solution.

The above-described pure solution of calcium dicyanamide is a valuable means for the rapid and simple preparation of solutions of a wide variety of other salts of dicyanamide in substantially pure form. For example, addition of one mol of ammonium carbonate or sulfate immediately yields a solution of the otherwise difficult to prepare ammonium dicyanamide. Further, while calcium dicyanamide cannot be prepared from sodium dicyanamide, the reverse is easily achieved by adding sodium carbonate or sulfate as described aforesaid to a solution of calcium dicyanamide.

Calcium dicyanamide dihydrate crystallizes in a columnar habit with the development of domes and pinacoids, has a cleavage parallel to the "b" axis, and has a positive optic sign. The refractive indices are as follows: $\alpha = 1.405 \pm 0.005$; $\beta = 1.480 \pm 0.003$; and $\gamma$ is approximately 1.82. The apparent optic axial angle as observed in air is 86°, and the true optic axial angle computed therefrom is 55°. The optic axial plane or principal optic section is perpendicular to the plane (010). The crystals are oriented so that the principal vibration direction of $\alpha$ is parallel to "b," the elongated crystal axis.

When heated to about 90°–110° C., calcium dicyanamide dihydrate sinters and loses its water of crystallization and the anhydrous salt thus formed does not melt below about 315° C. The anhydrous salt may be converted to the dihydrate by dissolving it in a quantity of water, and concentrating the solution. The dihydrate precipitates.

Calcium dicyanamide dihydrate in pure form is a white, crystalline material. It is soluble in water to the surprising extent of about 87 parts per 100 parts of water at 20° C., 89 parts at 25° C., 100 parts at 50° C., and 89 parts at 75° C.

The following examples illustrate the practice of the invention and are not to be deemed in limitation thereof. The parts are by weight unless otherwise noted.

*Example 1*

| Reactants | Parts | Molar Ratio |
|---|---|---|
| Cyanogen chloride | 61.4 | 1.0 |
| Cyanamide (18% aqueous) | 239 | 1.0 |
| Calcium hydroxide | 90 | 1.2 |
| Water | 200 | 11.1 |

The calcium hydroxide is carefully added to the agitated cyanamide solution, and any exothermic tendencies are overcome with cooling. The cyanogen chloride is slowly added to this vigorously agitated reaction mixture over two hours, and it is readily absorbed. The temperature of this reaction is not allowed to rise above substantially 30° C. Upon completion of the addition of cyanogen chloride the reaction mixture is no longer exothermic. The reaction mixture is neutralized with a small amount of hydrochloric acid and filtered to remove any insoluble materials. The clear filtrate is concentrated and calcium dicyanamide dihydrate precipitates and is recovered.

The water of hydration is removed either by heating the calcium dicyanamide dihydrate to substantially 100° C., or by drying it at a lower temperature under vacuum.

*Example 2*

| Reactants | Parts | Molar Ratio |
|---|---|---|
| Cyanogen chloride | 61.4 | 1.0 |
| Crude calcium cyanamide (58% CaNCN) | 137.5 | 1.0 |
| Water | 500 | 27.8 |

The cyanogen chloride is carefully added to the agitated aqueous slurry of crude calcium cyanamide in 1.5 hours. The temperature range is maintained at substantially 28°–30° C., and the cyanogen chloride is absorbed readily. As soon as exothermic tendencies stop, the reaction mixture is neutralized with dilute hydrochloric acid. The insoluble impurities are removed and a clear, slightly yellow filtrate is obtained. This filtrate contains mainly calcium dicyanamide and calcium chloride. The dicyanamide is precipitated as a zinc salt by the addition of substantially stiochiometric amounts of 30% zinc chloride. The zinc dicyanamide is filtered, washed thoroughly, and this moist cake is slurried with calcium hydroxide in a minimum amount of water. The resulting zinc hydroxide is removed from the aqueous solution containing substantially calcium dicyanamide. This solution is concentrated to produce crystalline calcium dicyanamide dihydrate which after recovery has physical properties identical with those described above.

A repetition of this experiment is run in which the aqueous slurry of crude calcium cyanamide is stirred for about one hour prior to the addition of the cyanogen chloride. The latter is added at substantially 20° C. at the rate of approximately one mol per 1.5 hours. The calcium dicyanamide obtained is identical with that obtained above.

Example 3

| Reactants | Parts | Molar Ratio |
|---|---|---|
| Cyanogen chloride | 61.4 | 1.0 |
| Crude calcium cyanamide (58% CaNCN) | 165 | 1.2 |
| Water | 500 | 27.8 |

This reaction is run as described in Example 2. The reaction temperature is maintained at substantially 20° C., and the cyanogen chloride is added over a period of 1.6 hours. The calcium dicyanamide is isolated by precipitating the dicyanamide as the copper salt by the addition of substantially stoichiometric amounts of copper nitrate solution. The insoluble copper dicyanamide is filtered, washed thoroughly with water, and reslurried with a stoichiometric amount of calcium hydroxide in a minimum of water. The copper hydroxide is removed and the clear aqueous filtrate containing substantially calcium dicyanamide is concentrated to yield crystals of this material having physical properties identical with those reported in Example 1.

Example 4

| Reactants | Parts | Molar Ratio |
|---|---|---|
| Cyanogen chloride | 61.4 | 1.0 |
| Crude calcium cyanamide (61% CaNCN) | 150 | 1.1 |
| Water | 330 | 13.9 |

The thick calcium cyanamide slurry is stirred about ten minutes prior to the addition of cyanogen chloride. This treatment serves to wet thoroughly the calcium cyanamide particles so that a satisfactory reaction with cyanogen chloride may be had. The cyanogen chloride is added at a temperature range of 24°–26° C. over a period of three hours. When the reaction is completed, as indicated by the spontaneous drop in temperature of a couple of degrees, the mixture is filtered to remove insoluble materials. The clear filtrate is adjusted to pH 5 with dilute hydrochloric acid and concentrated until substantially all the calcium dicyanamide therein has precipitated. Its properties are those recorded in Example 1.

Example 5

| Reactants | Parts | Molar Ratio |
|---|---|---|
| Crude calcium cyanamide (61% CaNCN) | 454 | 3.3 |
| Cyanogen chloride | 172 | 3.0 |
| Water | 1,000 | 55.6 |

The water is mixed with the calcium cyanamide and the resulting thick slurry stirred slowly for ten minutes at 25° C. The cyanogen chloride is added as a gas over the surface of the slurry in three hours at 24–26° C. The mixture was made slightly acid and filtered. A strong solution of zinc chloride is added to the filtrate until precipitation of zinc dicyanamide ceases. The yield of zinc dicyanamide based on the weight of the cyanogen chloride is 90%. When dry, the zinc dicyanamide has a purity of about 96%.

Example 6

The above experiment was repeated using equimolecular proportions of reagents, a reaction temperature of 20° C., a stirring time of one hour, and three hours for the addition of the cyanogen chloride. A 91% yield based on the recovery of the zinc salt was obtained.

Example 7

The following procedure is particularly adapted to the large scale preparation of calcium dicyanamide dihydrate.

In a closed steel kettle equipped with a turbo-agitator and cooling coil 178 parts of crude calcium cyanamide containing about 60% of crude commercial calcium cyanamide are slurried with 474 parts of water, a temperature of 23–25° C. being maintained by means of passage of tap water through the cooling coils. With the slurry at this temperature 86 parts of cyanogen chloride are admitted into the kettle above the surface of the slurry at the rate of 17–20 parts per hour. The pressure does not exceed about 5 lb./in.$^2$. Upon completion of the addition of cyanogen chloride, 18 parts of carbon dioxide vapor are slowly admitted which react with the excess $Ca(OH)_2$ present. The pressure rises to about 20 pounds per square inch with the addition of the carbon dioxide. The contents of the kettle are passed through a filter press. The yield of calcium dicyanamide in the filtrate is over 90% of a calcium dicyanamide contained thereon, based on the cyanogen chloride added. The pH of the filtrate is adjusted to 5. The solution is agitated for one hour, and then neutralized with sodium hydroxide. The resulting solution is concentrated at reduced pressure at a temperature below 50° C. until precipitation of calcium dicyanamide is substantially complete, the pH of the solution being maintained at 7. The precipitate is dried at 70° C. and is calcium dicyanamide dihydrate of 91% purity with an over-all yield of 89%.

This application is a continuation-in-part of my copending application Serial No. 618,074, filed September 22, 1945, now abandoned.

In that application the compound of the formula

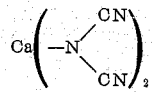

which was disclosed and claimed therein, was described therein as calcium dicyanimide. In the present specification and claims the spelling of the word "dicyanimide" has been changed to "dicyanamide" to make the spelling of this radical conform to the preferred usage of the chemical art.

I claim:

1. A member of the group consisting of calcium dicyanamide

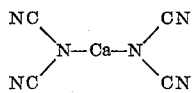

and its dihydrate.

2. Calcium dicyanamide having the formula

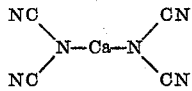

3. Calcium dicyanamide dihydrate having the formula

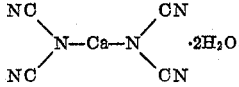

4. A method of preparing calcium dicyanamide from calcium cyanamide which comprises reacting calcium cyanamide and cyanogen chloride in an aqueous medium at a temperature between 0° and 50° C. until an aqueous solution of calcium dicyanamide is obtained, and recovering the calcium dicyanamide from said aqueous solution.

5. A method of preparing calcium dicyanamide from crude calcium cyanamide which comprises mixing crude calcium cyanamide with sufficient water to form an aqueous slurry, contacting said aqueous slurry with cyanogen chloride and maintaining the reaction mixture at a temperature between 0° and 50° C. until an aqueous solution of calcium dicyanamide is obtained, and filtering the said aqueous solution to remove insoluble impurities.

6. In the manufacture of calcium dicyanamide from calcium cyanamide the step which comprises reacting cyanogen chloride and calcium cyanamide in an aqueous medium at a temperature between 0° C. and 50° C. until an aqueous solution of calcium dicyanamide is obtained.

7. As a new and useful composition of matter, an aqueous solution containing calcium dicyanamide

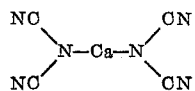

dissolved therein.

DANIEL E. NAGY.

REFERENCES CITED

The following references are of record in the file of this patent:

Williams: "Cyanogen Compounds," Edward Arnold and Co., London, 1949, 2d ed., page 38.

"Comptes Rendus," article by Manguin and Simon, vol. 170, pages 998–1001 (1920).

"Comptes Rendus," article by Biechler, vol. 200, pages 141–3 (1935).

Franklin: "Nitrogen System of Compounds," Reinhold Publishing Co., New York, N. Y. (1935), page 100.

Migrdichian: "The Chemistry of Organic Cyanogen Compounds," Reinhold Publishing Co., New York, N. Y. (1947), page 116.

Pranke, E. J.: "Cyanamid," the Chemical Publishing Co., Easton, Pa. (1913), page 14.